United States Patent [19]

Iso-Aho

[11] 4,352,228

[45] Oct. 5, 1982

[54] APPARATUS FOR ROTATABLY DRIVING A SHELL-TYPE ROLL FOR USE IN A PAPER MAKING MACHINE OR THE LIKE

[75] Inventor: Kalevi Iso-Aho, Jyväskylä, Finland

[73] Assignee: Valmet OY, Finland

[21] Appl. No.: 135,199

[22] Filed: Mar. 28, 1980

[30] Foreign Application Priority Data

Mar. 29, 1979 [FI] Finland .................................. 791063

[51] Int. Cl.³ .................. B21B 13/02; B60B 15/16
[52] U.S. Cl. ..................................................... 29/115
[58] Field of Search ............. 29/115, 116 R, 116 AD, 29/113, 113 AD; 74/410, 411; 162/369, 371, 373

[56] References Cited

U.S. PATENT DOCUMENTS

| | | | |
|---|---|---|---|
| 3,639,956 | 2/1972 | Justus | 29/115 X |
| 3,766,620 | 10/1973 | Roerig | 29/115 |
| 3,855,681 | 12/1974 | Andriola et al. | 29/115 |
| 3,997,952 | 12/1976 | Lehmann et al. | 29/115 |

*Primary Examiner*—Peter P. Nerbun
*Attorney, Agent, or Firm*—Steinberg & Raskin

[57] ABSTRACT

Mechanical drive apparatus for rotating the cylindrical shell of a roll, such as a suction or deflection-compensated roll utilized in paper machines, wherein an elongate member, such as a tubular shaft in the case of a suction roll or a massive axle in the case of a deflection-compensated roll, extends longitudinally through the interior of the shell, including a gear transmission having transmission gears through which rotative power is supplied to the shell from an input shaft thereof includes a support member annular portion disposed around one end of the elongate member so as to support the same, unitary bearing means disposed around the annular portion of the support member, drive gear means rotatably mounted on the unitary bearing means within a housing, apparatus preferably in the form of a coupling sleeve, which interconnects the drive gear means and the roll shell whereby the rotational power is transferred from the drive gear means to the shell in a manner such that changes in position of the roll shell relative to the drive gear means can be accommodated within limits. The transmission gears of the gear transmission are disposed within the same housing as the drive gear means, which housing provides support for the elongate member which extends through the shell interior.

9 Claims, 5 Drawing Figures

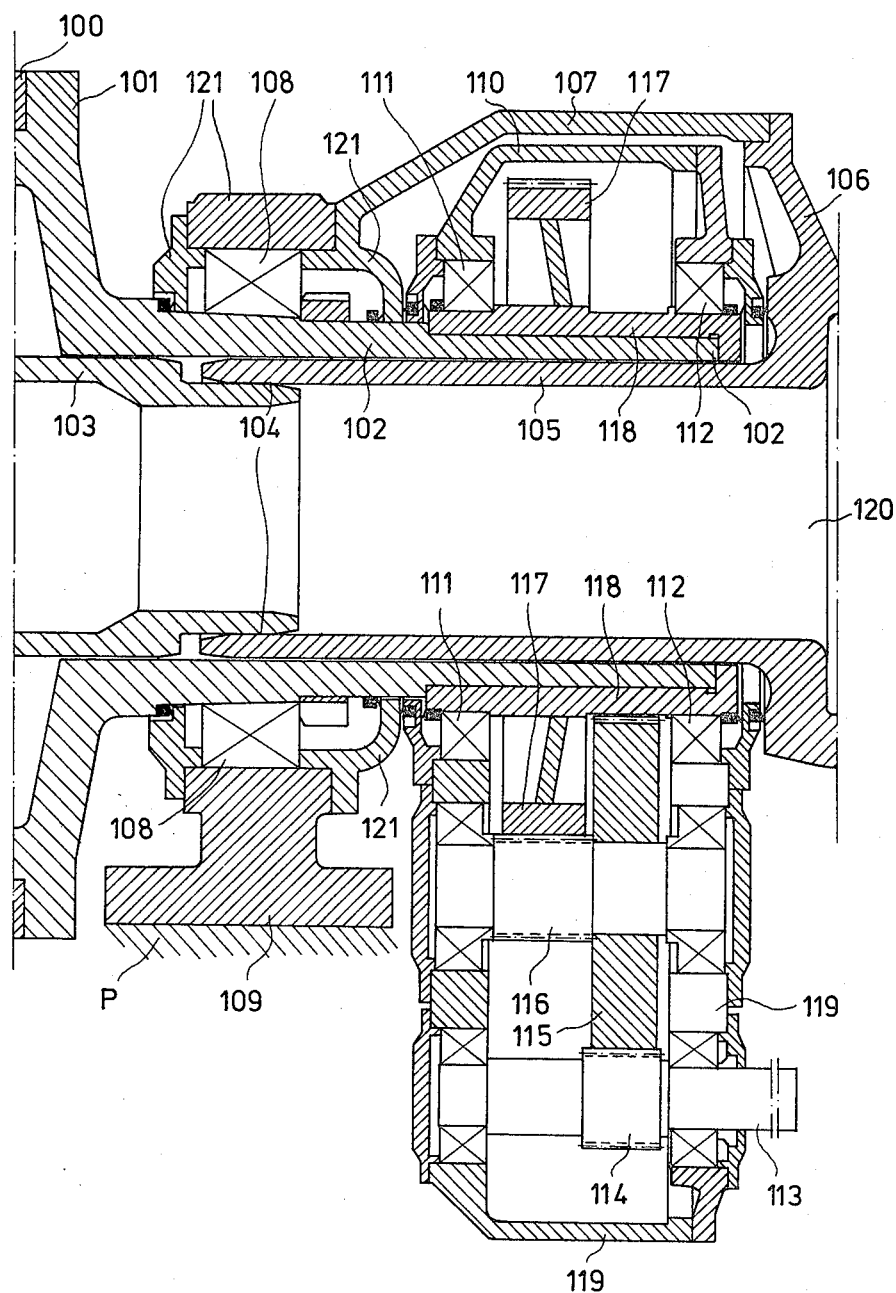
FIG. A
(PRIOR ART)

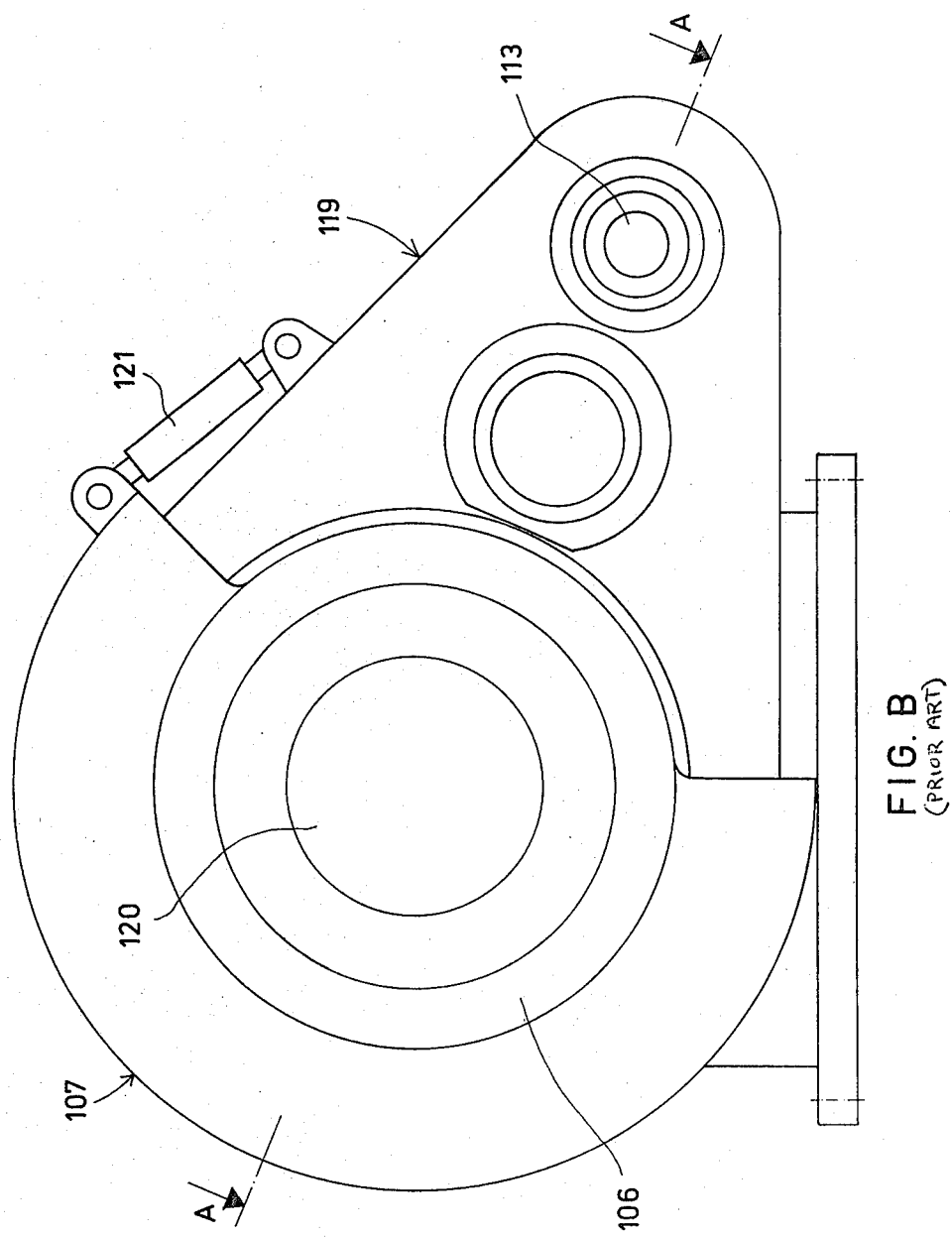
FIG. B (PRIOR ART)

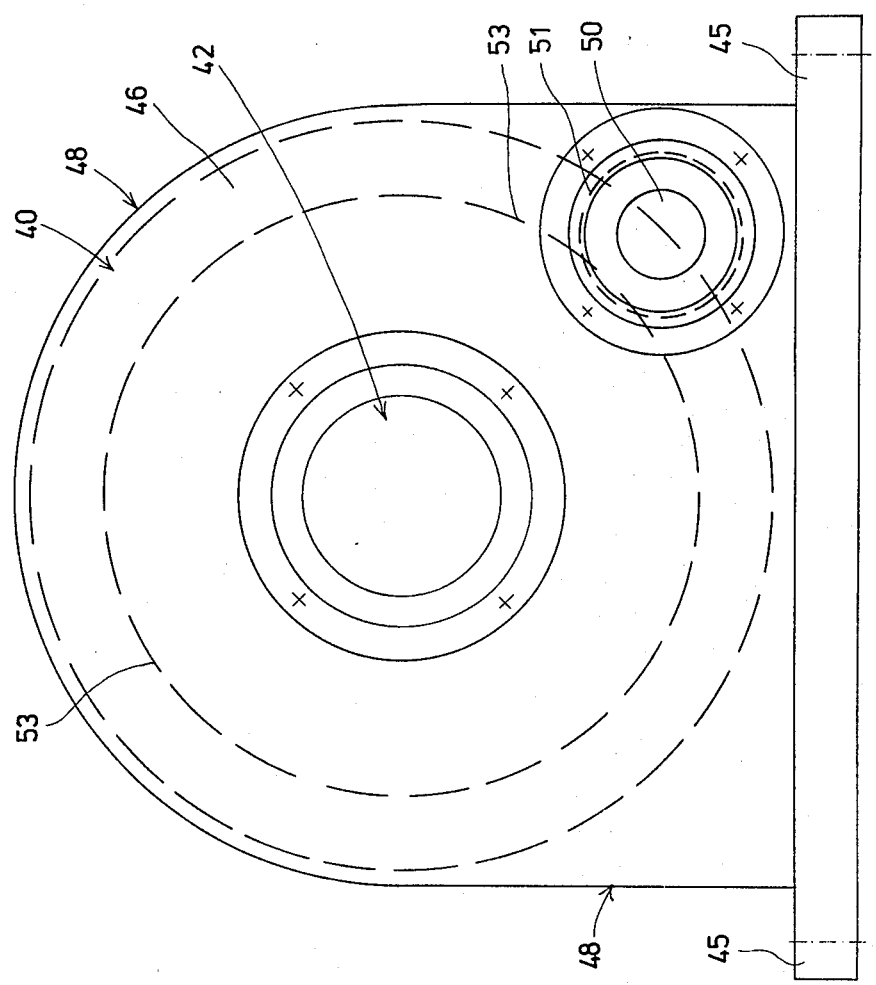

APPARATUS FOR ROTATABLY DRIVING A SHELL-TYPE ROLL FOR USE IN A PAPER MAKING MACHINE OR THE LIKE

BACKGROUND OF THE INVENTION

This invention relates generally to single or multiple stage mechanical drive apparatus for rotating a shell-type roll, such for example as a suction roll or a deflection-compensated roll of the type utilized in paper machines, whereby the shell of the roll is rotated through a transmission to which power is introduced at the input shaft thereof.

Drive apparatus for rotating shell-type rolls of the type discussed above, are, of course, known. Thus, for example, a typical mechanical drive currently in use in connection with rotating a suction roll is illustrated in FIGS. A and B. It is understood that drive apparatus substantially equivalent to that shown in FIGS. A and B are utilized in the rotation of the roll shells of deflection-compensated rolls.

The initial criteria in the design and dimensioning of suction rolls is the minimum diameter of the tubular suction shaft which extends longitudinally through the interior of the shell. Typically, such tubular suction shafts have relatively large dimensions due to the relatively high air flow requirements and for this reason the diameter of the tubular suction shaft necessarily requires that the transmission for rotating the roll have relatively large dimensions at least in the radial direction.

Typical conventional drive apparatus such as that illustrated in FIGS. A and B, described in greater detail below, have the recognized drawback that the tubular suction shaft which houses the suction box of the suction roll within the roll shell must be supported over a relatively large length. As a consequence, the deflections of the roll are relatively large creating correspondingly large flexural moments. Another drawback of the conventional drive apparatus is that the elements which support the tubular suction shaft in the case of a suction roll or the massive axle which extends through the roll shell in the case of a deflection-compensated roll, and the housing for the transmission have comprised separate components which is disadvantageous for the reason, among others, that the apparatus is quite heavy and complicated in manufacture.

Still another drawback of conventional drive apparatus of the type illustrated in FIGS. A and B is that the drive apparatus requires relatively large spacial accommodations at least in the radial direction of the roll.

Still another reason why conventional drive apparatus of the type illustrated in FIGS. A and B have proven to be not entirely satisfactory is that the gear transmission is typically located at a position which is remote from the bearing location wherein the roll is rotatably mounted thereby tending to even further increase the magnitude of the roll deflections during operation.

SUMMARY OF THE INVENTION

Accordingly, it is an object of the present invention to provide new and improved mechanical drive apparatus for rotating the cylindrical shell of a roll which avoids the drawbacks enumerated above.

In accordance with the present invention, this object and others are attained by providing a new and improved mechanical drive apparatus for rotating the cylindrical shell of a roll, such as a suction or deflection-compensated roll utilized in paper machines, wherein an elongate member, such as a tubular shaft in the case of a suction roll or a massive axle in the case of a deflection-compensated roll, extends longitudinally through the interior of the shell, the apparatus including a gear transmission through which rotative power is supplied to the shell.

The driving gear of the transmission is rotatably mounted on unitary bearing means, such as a single bearing or an equivalent group of bearings, the latter being disposed around a support member which functions to support the elongate member which longitudinally extends through the shell interior, e.g., a tubular shaft in the case of a suction roll or a massive stationary axle in the case of a deflection-compensated roll.

The rotational power is transferred from the drive gear to the roll shell through a coupling sleeve or the like which is constructed so as to accommodate changes in position of the roll shell relative to the drive gear within limits.

Further, the gear wheels of the transmission are rotatably mounted in the same housing in which the drive gear is mounted, the housing being provided in a manner such that the longitudinally extending elongate member disposed within the interior of the shell can derive support therefrom.

Significant advantages are obtained utilizing the structure of the present invention as described above. Among the most important of such advantages is the fact that a single or multiple stage gear transmission is provided which can be rigidly mounted on the bearing pedestal or stand of the roll yet which allows the roll shell and driving gear to change their positions relative to each other, such as those which result from deflection of the roll, and yet which provides a continuous meshing engagement of the various gears in the transmission. The weight of the drive apparatus is significantly reduced relative to conventional apparatus, in certain applications approaching a reduction of as much as 60%. Another important advantage obtained by such structure is the substantial reduction in the space required for the drive apparatus while simultaneously providing greater ease in mounting the drive. Further, whereas conventional drive apparatus which utilize two bearings in the support of the drive gear, tend to fix the latter in position thereby causing problems in the meshing of the gears when deflection occurs, the drive of the present invention can be advantageously constructed utilizing only a single bearing or unitary bearing structure. Further, the diameter of the unitary bearing can be constructed with a smaller diameter.

DESCRIPTION OF THE DRAWINGS

A more complete appreciation of the present invention and many of the attendant advantages thereof will be readily appreciated as the same becomes better understood by reference to the following detailed description when considered in connection with the accompanying drawings in which:

FIG. A is an axial section view of a suction roll and associated drive apparatus according to the prior art and comprising a section view taken along line A—A of FIG. B;

Figure 1:
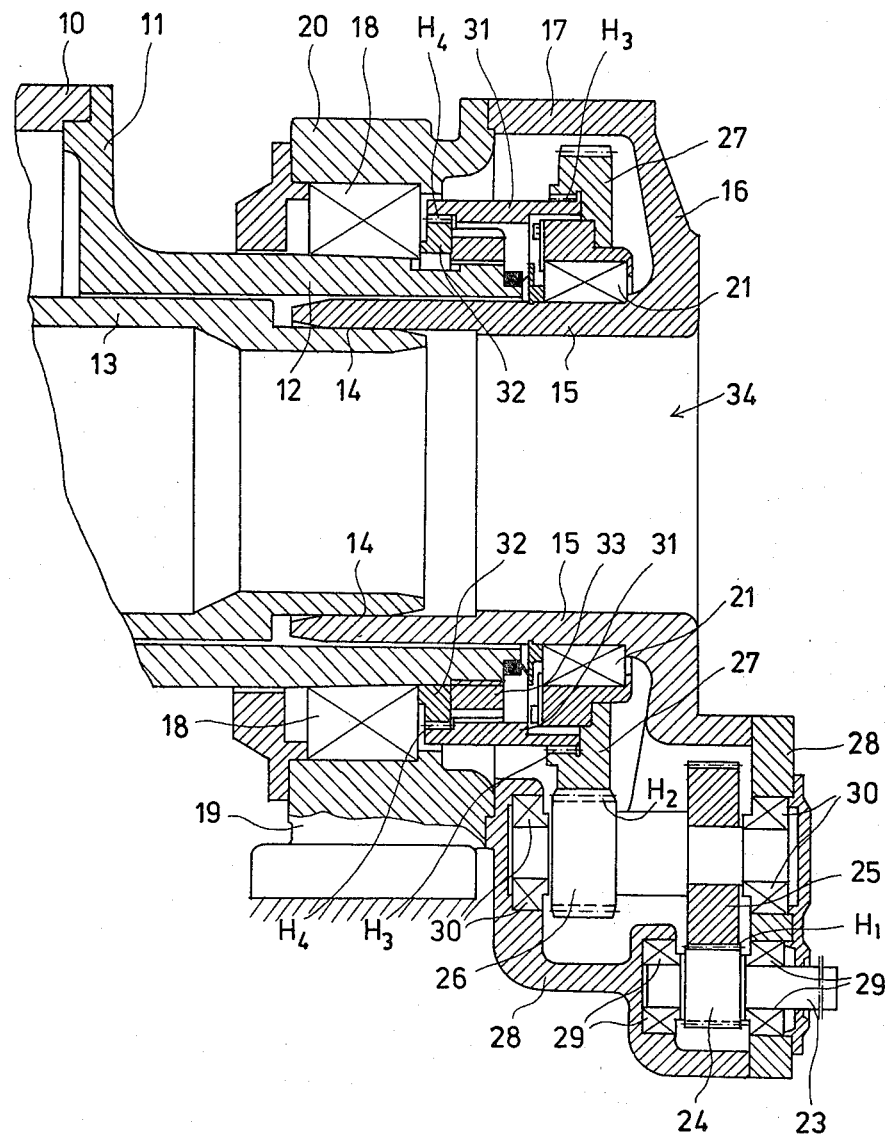
Figure 2:
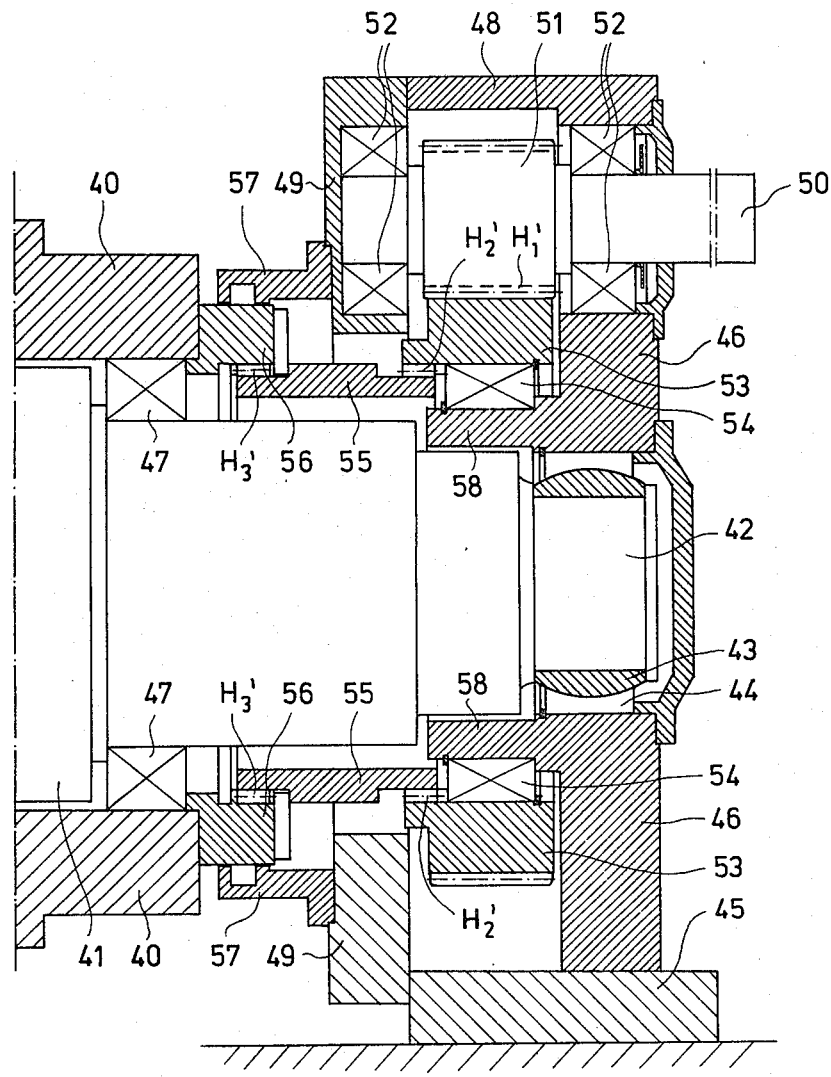

FIG. B is a front elevation view of the apparatus illustrated in FIG. A;

FIG. 1 is an axial section view of a suction roll in a paper machine or the like and associated drive apparatus according to the present invention;

FIG. 2 is a view similar to FIG. 1 wherein drive apparatus according to the present invention are associated with a deflection-compensated roll; and FIG. 3 is a front elevation view of the apparatus illustrated in FIG. 2.

DESCRIPTION OF THE PREFERRED EMBODIMENTS

Referring now to FIGS. A and B wherein like reference characters designate identical or corresponding parts throughout the several views, a typical conventional drive apparatus for rotating a suction roll according to the prior art will first be described. The suction roll comprises a foraminous cylindrical shell 100 through whose interior a tubular shaft 103 extends in the longitudinal direction as illustrated. A suction box (not shown) is supported within the tubular shaft 103 as will be understood by those skilled in the art. The tubular shaft 103 has a reduced diameter end portion which is supported through annular contact, designated 104, with the interior of a coaxial elongated tubular support portion 105. The tubular support portion 105 terminates at its outer end in a radially extending end portion 106 which itself is supported on an outer shell 107. The outer shell 107 is affixed to the stand 109 of the drive apparatus by means of various annular components 121. The stand 109 is mounted on the foundation P.

The shell 100 is rotatably mounted through the connection of an end portion 101 having an elongated axially extending tubular portion 102 which is itself rotatably mounted within a main bearing 108 which is supported in the stand 109 of the drive apparatus.

The gear transmission is disposed within a housing 119 and includes a rotatably mounted input shaft 113 which carries a gear wheel 114. Gear 114 meshes with and drives a gear 115 so that a gear 116 which is mounted on the same shaft as gear 115 meshes with and drives a gear 117. The gear 117 is mounted on a tubular shaft 118 which itself is mounted on the tubular portion 102 of the end member 101 fixed to shell 100.

A pair of rigid, spaced bearings 111, 112 are mounted on the tubular shaft 118 and rotatably support an inner housing 110, the latter being integrally formed with the housing 119 of the gear transmission. Thus, the inner housing 110 together with the housing 119 is supported to an extent through the bearings 111, 112, first from the tubular shaft 118 and through the latter from the tubular portion 102 of end member 101 which is fixed to shell 100, and through the bearing 108 in which the tubular portion 102 is mounted from the stand 109 of the drive apparatus. As seen in FIG. B, the inner housing 110 and integral housing 119, in addition to being supported in the manner described above, is located against the outer housing 107 by means of a turnbuckle screw 121.

The tubular section 105 defines an open interior through which a vacuum can be transmitted to the suction sectors of the roll shell 100 in a known manner.

Thus, the conventional drive apparatus as illustrated in FIGS. A and B, is seen to require a tubular supporting portion 105 which is relatively long thereby allowing deflections of relatively large magnitude to occur with consequent generation of large flexural moments. It is also seen that the support for the tubular shaft 103, namely the tubular section 105 comprises a separate element from the transmission housing thereby causing the apparatus to have a relatively great weight. Still further, the drive apparatus illustrated in FIG. A has a relatively large radial dimension and, additionally, the gear transmission is located at a point which is remote from the main bearing 108 tending to even further increase the extent to which the roll will deflect during operation.

The drive apparatus of the present invention overcomes the various drawbacks described above. Referring to FIG. 1, the drive apparatus of the present invention is illustrated in conjunction with a suction roll of the type utilized in paper machines. The suction roll has a foraminous cylindrical shell 10 on one end of which is affixed an end member 11 which includes a tubular portion 12. It is noted that the tubular portion 12 is substantially shorter than the equivalent tubular portion 102 of the conventional drive apparatus illustrated in FIG. A. A stationary tubular shaft 13 extends longitudinally through the interior of shell 10, a suction box (not shown) being supported therein in a conventional manner. The tubular shaft 13 terminates at a reduced diameter end portion which is supported by annular contact, designated 14, with an annular support portion 15 of the housing for the drive apparatus. The annular support portion 15 is also seen as being substantially shorter than the equivalent tubular supporting section 105 of the apparatus illustrated in FIG. A. The annular support portion 15 is integrally connected to an end portion 16 of the drive housing. As seen in FIG. 1, the end portion 16 is also integrally formed with a mantle 17 which itself is connected to a mantle portion 20 by a screw connection or the like (not shown). The mantel portion 20 is itself supported on the stand 19 of the drive apparatus.

The suction roll is rotatably carried in a main bearing 18 which is mounted over the tubular portion 12 of the end member 11, the main bearing 18 being itself housed in the mantle portion 20 which, as described above, is supported on the stand 19. The annular supporting member 15 defines an interior space through which suction air communicates with the interior of the tubular shaft 13.

According to the invention, the gear transmission of the drive apparatus is accommodated within a housing 28 which differs from conventional apparatus of the type described above in connection with FIG. A in that the housing 28 is integrally connected with the housing 16, 17 of the drive apparatus.

The gear transmission of the drive apparatus comprises an input shaft 23 rotatably mounted in bearings 29 in the housing 28. The input shaft 23 carries a gear wheel 24 which meshes at H1 with a gear 25 carried on a bearing 30 in the housing 28. A gear 26 is mounted on the same shaft with gear 25 and meshes with a gear 27 at H2.

It is noted that the gear 27, which comprises a driving gear of the transmission, is rotatably mounted on a unitary bearing 21, the latter being mounted on the annular supporting portion 15 which is integral with the housing 16. The bearing 21, according to the present invention, is characterized in that the same will accommodate adjustments in the position of the drive gear 27 within certain sufficiently wide limits.

Apparatus are provided which interconnect the drive gear 27 and the roll shell 10 in a manner such that the rotational power will be transferred from the drive gear to the shell and, in particular, such rotational power will be transferred in a manner such that changes in position of the roll shell 10 relative to the drive gear 27 within limits will be accommodated. More particularly, a coupling sleeve 31 is provided having a pair of toothed rims formed at its respective ends, one of the toothed rims being in meshing engagement with the toothed rim of the driving gear 27 while the other toothed rim of the coupling sleeve is in meshing engagement with a toothed rim of an annular member 32 which is coupled to the end of the roll shell 10. In particular, the drive gear 27 carries an inner toothed rim which meshes at H3 with an external toothed rim of the coupling sleeve 31. The toothed rim provided at the other end of the coupling sleeve 31 comprises an internal toothed rim which meshes at H4 with an outer toothed rim of an annular member 32 which in the present embodiment comprises an externally toothed gear. The gear 32 is coupled to the roll shell 10 through a ring 33 affixed thereto and which itself is affixed to the tubular portion 12 of the end member 11 of shell 10.

By the particular arrangement described above, it is possible for deflections of the roll to be accommodated by the gear transmission by virtue of the particular construction of the coupling sleeve and its cooperation with the driving gear 27 and annular member 32. Such deflections will not interrupt the meshing engagement of these respective elements. It is further noted that the gear transmission is rigidly affixed to the stand of the roll and, additionally, the space requirements of the drive apparatus are significantly reduced relative to the conventional apparatus illustrated in FIG. A. It is further noted that only a unitary bearing 21 is required to support the drive gear as opposed to the two bearings 11, 12 necessary in conventional drive apparatus. This feature facilitates the accommodation of the roll during operation to an extent not possible with conventional apparatus.

Referring to FIGS. 2 and 3, drive apparatus according to the present invention are illustrated in conjunction with a deflection-compensated roll of the type utilized in paper machines. The deflection-compensated roll illustrated in FIGS. 2 and 3 comprise a roll shell 40 through whose interior extends an elongate member in the form of a massive stationary axle 41, the shell 40 being rotatably mounted on the axle 41 at its end portions on respective bearings. Thus, at the end of the roll at which rotative power is supplied to the shell 40, the latter is rotatably mounted on the axle 41 by means of a bearing 47. It is understood that deflection compensating elements such as sliding shoes and/or pressurized fluid chambers, are provided in the space defined between the shell 40 and axle 41.

Axle 41 has a reduced diameter end portion 42 which itself is supportingly mounted in concentric rings 43, 44 which engage each other along spherical surfaces. The rings 43, 44 are themselves mounted in a circular opening formed in the frame 46 of the apparatus. A stand 45 supports the frame 46.

The gear transmission comprises an input shaft 50 supported by bearings 52 in the main housing 48 of the drive. Input shaft 50 carries a gear wheel 53 which meshes at H1' with a gear 51 which comprises the driving gear in the illustrated arrangement.

The driving gear 53 is rotatably supported on and extends around an inwardly extending annular portion 58 of housing 46 which, as mentioned above, serves to support the end portion 42 of axle 41 which in turn supports the roll shell 40. A unitary bearing 54 is thus provided over the annular portion 58 of housing 46 over which the driving gear 53 is mounted.

According to the invention, the driving gear is interconnected to the roll shell in a manner such that changes in position of the roll shell relative to the driving gear can be accommodated within limits. To this end, a toothed coupling sleeve 55 is provided having a pair of toothed rims formed at its respective ends. In the illustrated embodiment, the internal toothed rim of driving gear 53 meshes at H2' with an external toothed rim on the coupling sleeve 55. The other toothed rim of the coupling sleeve 55 meshes at H3' with an internal toothed rim of an annular member in the form of a ring 56 which is affixed to the end of the shell 40 by conventional means, such as by screw fasteners.

Thus, it is seen that although in the respective embodiments illustrated in FIGS. 1 and 2, the driving gears 27, 53 include internal toothed rims which mesh with an external toothed rim of the coupling sleeves 31, 55, the coupling sleeve 31 at its other end has an internal toothed rim which meshes with an external toothed rim provided on the annular member or gear 32 which is coupled to the shell 10 whereas an external toothed rim is provided on coupling sleeve 55 which meshes with an internal toothed rim on the annular member 56. It is noted, however, in both cases that the driving gears 27, 53 are mounted on unitary bearings 21, 54 which themselves are mounted on annular supporting portions 15, 58 which function to support the elongate members 13, 41 which extend through the interior of the shell. In this manner, deflection of the rolls within relatively wide limits can be accommodated without the risk of a breakdown in the drive due to poor gear meshing.

It is also seen in both embodiments that the various transmission gears are disposed within the same housing as the driving gears, which housing provides support for the respective elongate members which extend through the interior of the respective shells.

Returning to the embodiment illustrated in FIG. 2, an annular portion 57 is provided on one end portion 49 of the drive housing. The member 57 provides a good seal against the outer surface of the annular member 56 which is secured to the end of shell 40 utilizing known packings and the like.

As mentioned above, it is a feature of the present invention that the bearing 54 can accommodate adjustments in the position of the driving gear 53 so that the meshing engagement as H1' and H2' are maintained at all times. Further, the arrangement accommodates changes in position within certain limits of the roll shell 40 due to the transmission of rotative power from the drive gear 53 to the shell 40 through coupling sleeve 55 having toothed rims which mesh at H2' and H3' with the respective gear and shell and which permit positional adjustments of these components with respect to each other within relatively wide limits.

Obviously, numerous modifications and variations of the present invention are possible in the light of the above teachings. It is therefore to be understood that within the scope of the claims appended hereto, the invention may be practiced otherwise that an specifically disclosed herein.

What is claimed is:

1. In mechanical drive apparatus for rotating the cylindrical shell of a roll, such as a suction or deflection-compensated roll utilized in paper machines, wherein an elongate member, such as a tubular shaft in the case of a suction roll or a massive axle in the case of a deflection-compensated roll, extends longitudinally through the interior of said shell, including transmission gears through which rotative power is supplied to the shell from an input shaft thereof, the improvement comprising:
- a support member having an annular portion disposed around one end of the elongate member;
- unitary bearing means disposed around said annular portion of said support member;
- toothed drive gear means rotatably mounted on said unitary bearing means, said drive gear means being situated within a housing;
- a set of meshing transmission gears adapted to transmit rotative power from the input shaft to said toothed drive gear means;
- means interconnecting said drive gear means and roll shell for transferring the rotational power from the former to the latter in a manner such that changes in position of the roll shell relative to said drive gear means can be accommodated within limits; and
- wherein the transmission gears of the gear transmission are disposed within the same housing as said drive gear means and wherein said housing provides support for the elongate member extending through said shell interior.

2. The combination of claim 1 wherein said power transferring means comprises a toothed coupling member.

3. The combination of claim 2 wherein said toothed coupling member comprises a sleeve having a pair of toothed rims formed at the respective ends thereof, and wherein said drive gear means includes a toothed rim, the latter being in meshing engagement with one of said toothed rims of said coupling sleeve and further including an annular member coupled to an end of the roll shell and including a toothed rim which is in meshing engagement with the other one of said toothed rims of said coupling sleeve.

4. The combination of claim 3 wherein said toothed rim of said driving gear means comprises an annularly extending internal toothed rim and wherein said toothed rims of said coupling sleeve each comprise an annularly extending external toothed rim and wherein said toothed rim of said annular member comprises an internal toothed rim.

5. The combination of claim 3 wherein said toothed rim of said driving gear means comprises an annularly extending internal toothed rim and wherein the one of said coupling sleeve toothed rims which is in meshing engagement with the driving gear toothed rim comprises an annularly extending external toothed rim, and wherein said toothed rim of said annular member comprises an annularly extending external toothed rim and wherein the one of the coupling sleeve toothed rims which is in meshing engagement with the annular member toothed rim comprises an annularly extending internal toothed rim.

6. The combination of claim 5 wherein said annular member comprises an external toothed gear which is coupled to said roll shell by a ring member.

7. The combination of claim 1 wherein said roll comprises a suction roll and said elongate member which extends through the interior of said cylindrical shell comprises a tubular shaft, the shell being rotatably mounted at a tubular end portion thereof in a main bearing mounted in a housing, said housing including an inner tubular portion the interior of which communicates with the interior of the tubular shaft and through which suction can be transmitted to the interior of said tubular shaft, said tubular portion of the housing being in annular contact with said tubular shaft substantially in the plane of said main bearing, the improvement further comprising said driving gear means being rotatably mounted on said inner tubular portion of said housing.

8. The combination of claim 1 wherein said roll comprises a deflection-compensated roll and said elongate member which extends through the interior of said cylindrical shell comprises a solid axle having an end portion and a housing supporting said axle end portion through rings having substantially spherical surfaces, the improvement further comprising said housing further including in the vicinity of said spherical surface supporting rings an inwardly extending annular portion which extends coaxially over the end portion of said axle, said annular portion being integrally affixed to a stand for the drive apparatus, and wherein said driving gear means are rotatably mounted on a bearing which is itself mounted on said inwardly extending annular portion.

9. The combination of claim 1 wherein said support member constitutes a part of said housing in which said toothed drive gear means and transmission gears are situated and which provides support for the elongate member extending through the shell interior.

* * * * *